(12) United States Patent
Hara et al.

(10) Patent No.: US 10,232,697 B2
(45) Date of Patent: Mar. 19, 2019

(54) BATTERY MOUNTING STRUCTURE FOR VEHICLE

(71) Applicant: TOYOTA JIDOSHA KABUSHIKI KAISHA, Aichi (JP)

(72) Inventors: Yasuhiro Hara, Odawara (JP); Seigo Fujishima, Miyoshi (JP); Masayoshi Ishikawa, Susono (JP); Masayuki Kitaura, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/498,713

(22) Filed: Apr. 27, 2017

(65) Prior Publication Data

US 2017/0313170 A1 Nov. 2, 2017

(30) Foreign Application Priority Data

Apr. 28, 2016 (JP) ................................ 2016-090322

(51) Int. Cl.
| | |
|---|---|
| *B60R 16/04* | (2006.01) |
| *B60K 1/04* | (2019.01) |
| *B60L 11/18* | (2006.01) |
| *H01M 2/10* | (2006.01) |

(52) U.S. Cl.
CPC ............ *B60K 1/04* (2013.01); *B60L 11/1877* (2013.01); *B60L 11/1879* (2013.01); *H01M 2/1077* (2013.01); *H01M 2/1083* (2013.01); *B60K 2001/0438* (2013.01); *H01M 2220/20* (2013.01)

(58) Field of Classification Search
CPC .... B60K 1/04; B60K 1/00; B60K 2001/0438; B62D 25/20; B62D 25/2036; B62D 21/15; B62D 21/11; B62D 21/157; B62D 21/00; B62D 21/02; B62D 21/09; B60L 11/1877; B60L 11/1851; B60L 11/18; H01M 2/1094; H01M 2/1083; H01M 2/1077; H01M 2/1072; H01M 2/10; H01M 2/08; H01M 2/00; H01M 2/1016; H01M 2300/0065; H01M 2220/20
See application file for complete search history.

(56) References Cited

U.S. PATENT DOCUMENTS 5,681,057 A * 10/1997 Whirley .................. B60K 1/04
180/68.5
7,695,865 B2 * 4/2010 Saito .................. H01M 4/0404
429/209

(Continued)

FOREIGN PATENT DOCUMENTS

| DE | 102012000622 A1 | 7/2013 |
|---|---|---|
| JP | 2013-168261 A | 8/2013 |
| WO | 2010/098271 A1 | 9/2010 |

*Primary Examiner* — James M Dolak
(74) *Attorney, Agent, or Firm* — Hauptman Ham, LLP

(57) ABSTRACT

A battery mounting structure having an enhanced rigidity against an impact load applied from the side is provided. Battery modules are juxtaposed to form arrays of the battery pack in a battery pack and the battery pack is disposed between the frame members. A load transmission member is disposed in a clearance between the battery modules adjacent to each other in a width direction of the vehicle. The load transmission member is crushed in the width direction by an impact load applied from the side of the vehicle to absorb collision energy.

10 Claims, 13 Drawing Sheets

(56) References Cited

U.S. PATENT DOCUMENTS

| | | | | |
|---|---|---|---|---|
| 8,012,620 B2* | 9/2011 | Takasaki | ................ | B60K 1/04 |
| | | | | 429/100 |
| 8,561,743 B2* | 10/2013 | Iwasa | ................ | B60K 1/04 |
| | | | | 180/68.5 |
| 8,689,919 B2* | 4/2014 | Maeda | ................ | B62D 21/157 |
| | | | | 180/311 |
| 8,696,051 B2* | 4/2014 | Charbonneau | ....... | B62D 21/157 |
| | | | | 296/187.12 |
| 8,733,487 B2* | 5/2014 | Usami | ................ | B60K 1/04 |
| | | | | 180/68.5 |
| 8,733,987 B2* | 5/2014 | Lin | ................ | G09F 9/33 |
| | | | | 362/396 |
| 8,833,839 B2* | 9/2014 | Young | ................ | B62D 21/157 |
| | | | | 296/187.08 |
| 8,939,246 B2* | 1/2015 | Yamaguchi | ............ | B60K 1/04 |
| | | | | 180/311 |
| 8,950,536 B2* | 2/2015 | Maguire | ................ | B60K 1/04 |
| | | | | 180/68.5 |
| 9,022,152 B2* | 5/2015 | Imamura | ............ | B62D 21/157 |
| | | | | 180/68.5 |
| 9,034,502 B2* | 5/2015 | Kano | ................ | B60K 1/04 |
| | | | | 429/99 |
| 9,045,163 B2* | 6/2015 | Theodore | ................ | B62D 21/02 |
| 9,533,600 B1* | 1/2017 | Schwab | ................ | B60L 11/1879 |
| 9,694,854 B2* | 7/2017 | Nusier | ................ | B62D 21/157 |
| 9,809,101 B2* | 11/2017 | Ikeda | ................ | B60K 1/04 |
| 9,937,781 B1* | 4/2018 | Bryer | ................ | B60K 1/04 |
| 9,987,913 B2* | 6/2018 | Hara | ................ | B60K 1/04 |
| 10,106,030 B2* | 10/2018 | Kunii | ................ | B60K 15/03504 |
| 10,112,470 B2* | 10/2018 | Hamilton | ................ | B60K 1/04 |
| 10,112,563 B2* | 10/2018 | Ashraf | ................ | B60R 19/34 |
| 2011/0297467 A1 | 12/2011 | Iwasa et al. | | |

\* cited by examiner

BATTERY MOUNTING STRUCTURE FOR VEHICLE

CROSS REFERENCE TO RELATED APPLICATIONS

The present application claims the benefit of priority to Japanese Patent Application No. 2016-090322 filed on Apr. 28, 2016 with the Japanese Patent Office, the entire contents of which are incorporated herein by reference in its entirety.

BACKGROUND

Field of the Disclosure

Embodiments of the present application relate to the art of a structure for mounting a battery for storing electrical energy in a vehicle Discussion of the Related Art PCT international publication No. 2010/098271 describes one example of a battery mounting structure in vehicles. According to the teachings of PCT international publication No. 2010/098271, a battery assembly is disposed under a floor panel of a vehicle. Specifically, the battery assembly includes a first battery unit comprising a plurality of batteries stacked in a vertical direction and a second battery unit comprising a plurality of batteries stacked in a transverse direction. In order to optimize the weight balance of the vehicle in the longitudinal direction, a pair of arrays of the first battery unit are juxtaposed in the longitudinal direction of the vehicle while keeping a predetermined clearance therebetween, and harnesses of the batteries are arranged in the clearance between the battery arrays.

When an impact load is applied to the vehicle taught by PCT international publication No. 2010/098271 from the side, only one of the battery array is subjected to the impact load. Consequently, one of the battery arrays may be deformed and the harnesses held in the clearance between the battery arrays may be damaged.

SUMMARY

Aspects of the present disclosure have been conceived noting the foregoing technical problems, and it is therefore an object of the present disclosure is to provide a battery mounting structure having an enhanced rigidity against an impact load applied from the side.

Embodiments of the present disclosure relate to a battery mounting structure for a vehicle, comprising: a pair of frame members extending in a longitudinal direction of the vehicle while maintaining a predetermined clearance therebetween in a width direction of the vehicle; and a battery pack having a cell stack formed of a plurality of single cells that is disposed between the frame members. In order to achieve the above-explained objective, according to the present disclosure, the battery mounting structure is provided with a load transmission member that is disposed in a clearance between arrays of the cell stacks to transmit an impact load applied from a side of the vehicle in a width direction of the vehicle.

In a non-limiting embodiment, the load transmission member may be crushed in the width direction of the vehicle by the impact load applied from the side of the vehicle to absorb collision energy. In addition, the load transmission member may be adapted to transmit the impact load while detouring the cable member extending longitudinally in the clearance. The load transmission member may include a protector portion covering the cable member at least partially.

In a non-limiting embodiment, the arrays of the cell stacks may be arranged in a casing while keeping a predetermined clearance in the width direction, and at least one of the casing, the load transmission member, and other member interposed between the cable member and a vehicle compartment may be protected from electromagnetic wave. The cable member may include a first cable member and a second cable member to which a higher voltage is applied to the load transmission member may also be protected from the electromagnetic wave, and may be adapted to cover the second cable member at least partially. The single cell may include a solid electrolyte, and the battery pack may be attached to the frame members in such a manner that the single cells are juxtaposed in the width direction of the vehicle. The battery pack may be disposed between the frame members in such a manner that side faces of the casing extend parallel to inner faces of the frame members.

In a non-limiting embodiment, the battery pack may include a battery module comprising a pair of end plates holding the cell stack from both ends, and a bundling member connecting the end plates to bundling the cell stack between the end plates. The battery module is arranged in such a manner that an outer face of one of the end plates extends parallel to an inner face of the casing.

Thus, according to the embodiment of the present application, the load transmission member is interposed between the arrays of the cell stacks. According to the embodiments of the present disclosure, therefore, rigidity of the battery pack in the width direction may be enhanced to enhance rigidity of the vehicle.

The load transmission member may be crushed in the width direction to absorb collision energy applied to the vehicle from the side to lighten impact load applied to the battery pack.

Since the load transmission member transmits the impact load while detouring the cable member, the cable member may be protected from the impact load.

Since the casing is made of electromagnetic protective material at least partially, passengers in the vehicle compartment may be protected from the electromagnetic wave radiated from the cable member.

The passengers in the vehicle compartment may be protected from the electromagnetic wave radiated from the cable member by using the load transmission member made of electromagnetic protective material.

Since the battery pack is fixed to the frame members, the impact load is applied to one of the frame members, and the impact load applied to the battery pack may be weakened.

In addition, since the single cells are juxtaposed in the width direction of the vehicle, the rigidity of the vehicle against the impact load applied from the side of the vehicle may be further enhanced.

Since the single cells are juxtaposed in the width direction of the vehicle in the battery module, the rigidity of the battery module itself may be enhanced. For this reason, the rigidity of the vehicle against the impact load applied from the side of the vehicle may be further enhanced.

The battery modules thus having high rigidity are juxtaposed to form longitudinal arrays, and the right and the left arrays extend parallel to the frame members. For this reason, the rigidity of the vehicle against the impact load applied from the side of the vehicle may be further enhanced.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
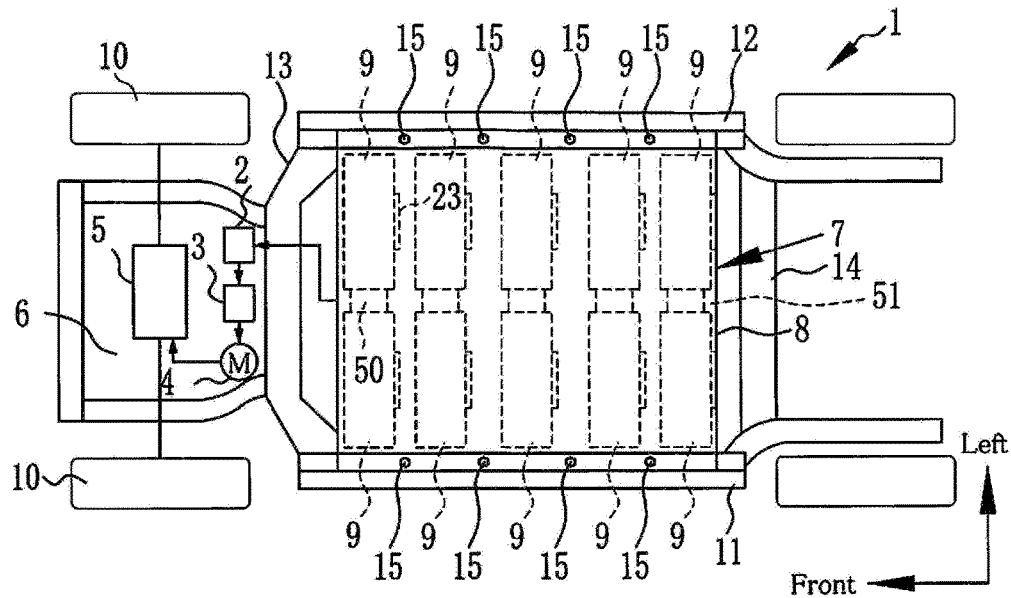
FIG. 1 is a schematic illustration showing one example of a bottom structure of the vehicle to which the battery mounting structure according to the present disclosure is applied.

Hereinafter, embodiments of the present disclosure will be explained with reference to the accompanying drawings. Turning now to FIG. 1, there is shown one example of a bottom structure of a vehicle to which the battery mounting structure according to the present disclosure is applied. In the vehicle 1 shown in FIG. 1, a converter 2, an inverter 3, a motor 4, and a power transmission unit 5 are arranged in a front compartment 6, and a battery pack 7 as a secondary battery is arranged under a floor panel. The battery pack 7 includes a cuboid casing 8 and a plurality of battery modules 9 individually formed of a stack of single cells. In the casing 8, five of the battery modules 9 are juxtaposed to form a right array, and five of the battery modules 9 are juxtaposed to form a left array. The converter 2 is adapted to increase a voltage from the battery modules 9, and to apply the voltage to the inverter 3 while stabilizing. The inverter 3 converts the direct current supplied from the battery modules 9 into the alternate current while controlling frequency. The power transmission unit 5 transmits torque of the motor 4 to front wheels 10 while increasing or decreasing. Here, the inverter 3 may also be connected directly to the battery modules 9 while omitting the converter 2. In addition, the converter 2, the inverter 3, the motor 4 and the power transmission unit 5 may also be arranged in the rear side of the vehicle 1 to drive rear wheels.

In the vehicle 1, a front end of a right side sill 11 extending in the right side is joined to a right end of a transversely extending front cross element 13, and a rear end of the right side sill 11 is joined to a right end of a transversely extending rear cross element 14. Likewise, a front end of a left side sill 12 is joined to a left end of the front cross element 13, and a rear end of the left side sill 12 is joined to a left end of the rear cross element 14. Here, the right side sill 11 and the left side sill 12 may also be situated slightly inside of the side ends of the vehicle 1.

Thus, the battery pack 7 is disposed between the right side sill 11 and the left side sill 12. The battery pack 7 serves as a reinforcement to enhance lateral strength of the side sills 11 and 12 against an impact load applied from the side of the vehicle 1. To this end, a right end of the battery pack 7 is fixed to the right side sill 11 at predetermined points by predetermined fixing members 15 such as bolts or the like, and a left end of the battery pack 7 is also fixed to the left side sill 12 at predetermined points by the fixing members 15. That is, the right side sill 11 and the left side sill 12 serve as frame members.

Figure 2:
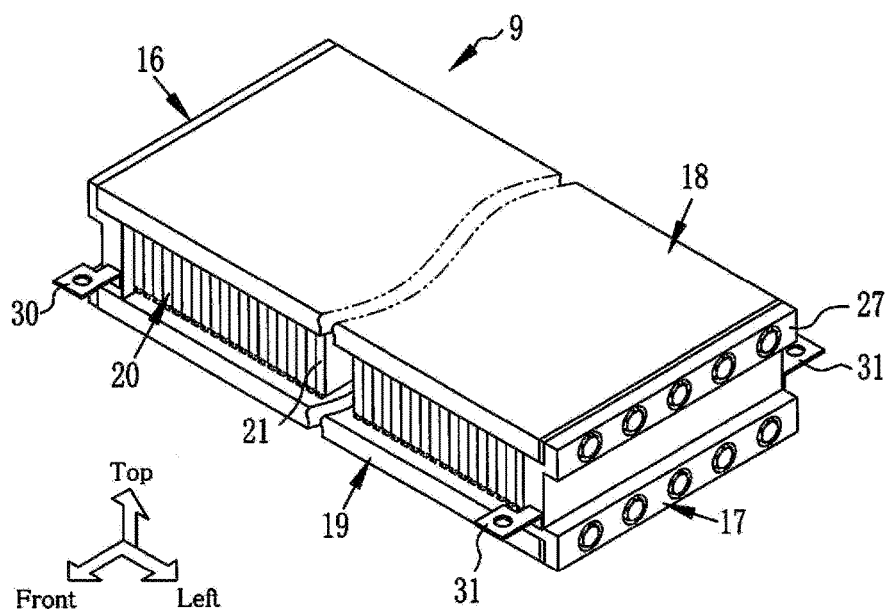
FIG. 2 is a perspective view showing one example of the battery module.

FIG. 2 is a perspective view showing one example of the battery module 9. As illustrated in FIG. 2, the battery module 9 comprises a first end plate 16, a second end plate 17, a first tension plate 18, a second tension plate 19, and a cell stack 20. Thus, each of the battery modules 9 has a cuboid shape, and individually arranged in the battery pack 7 in such a manner that the long sides extend in the width direction of the vehicle 1 and that the first end plate 16 and the second end plate 17 extend in the longitudinal direction of the vehicle 1.

Figure 3:
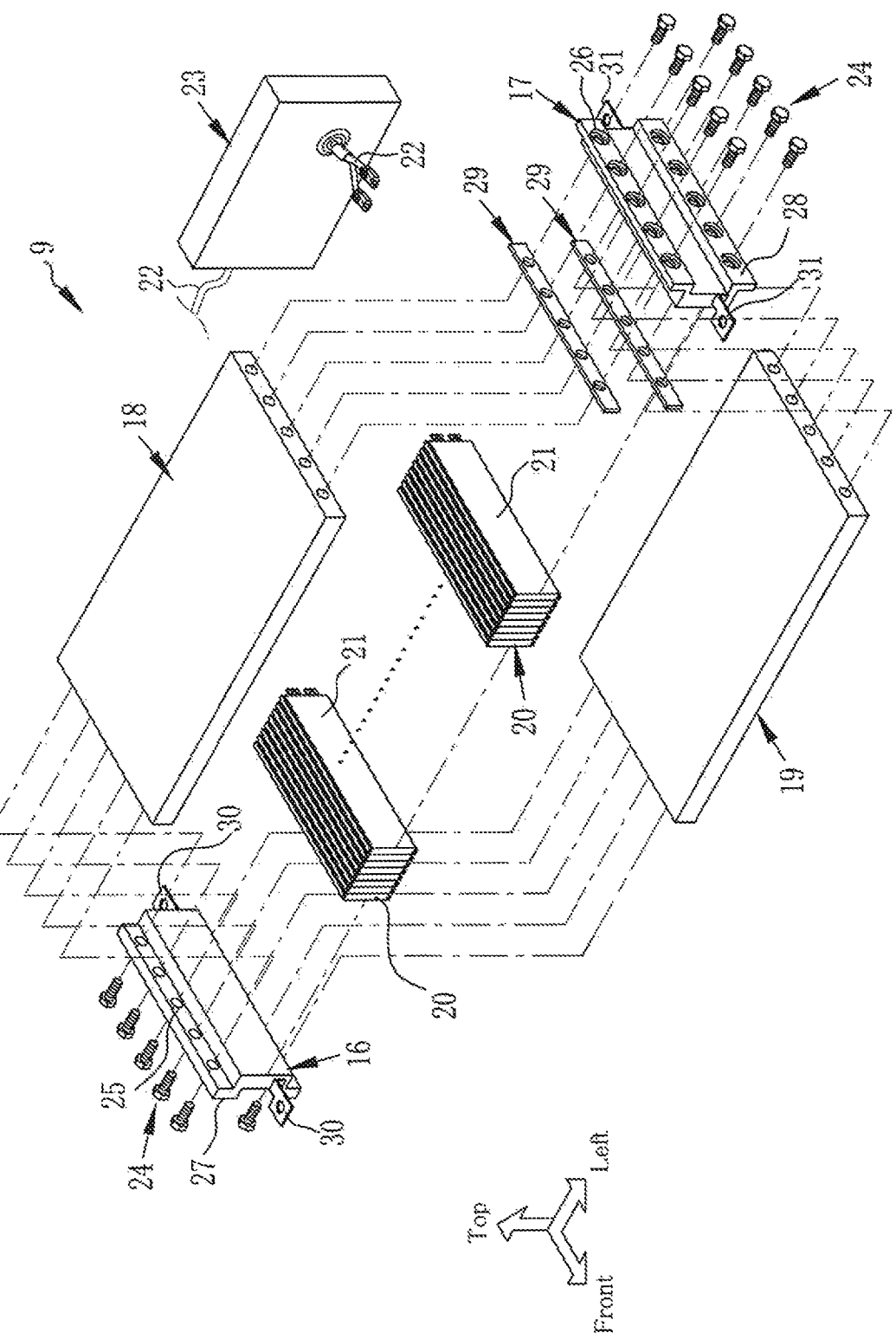
FIG. 3 is an exploded view of the battery module shown in FIG. 2.

Components of the battery module 9 as an all-solid battery are shown in FIG. 3 in more detail. As illustrated in FIG. 3, the cell stack 20 is formed of a plurality of flat rectangular single cells 21 juxtaposed in the width direction of the vehicle 1. Although the single cells 21 are juxtaposed in the width direction of the vehicle 1 in FIG. 3, the direction to juxtapose the single cells 21 should not be limited to the specific direction.

Each of the single cell 21 includes a pair of electrodes and a solid electrolyte interposed between the electrodes (neither of which are shown). The single cells 21 forming the cell stack 20 are connected in series through a cable 22, and the battery module 9 outputs electrical power in accordance with the number of the single cells 21 through a pair of electrodes exposed to outside. Here, in FIG. 3, only a part of the cable 22 is depicted for the sake of illustration. The single cells 21 are electrically connected with a battery ECU 23 through the cable 22, and the battery ECU 23 is configured to stabilize the power output of the single cell 21 while observing voltage. As illustrated in FIG. 1, specifically, the battery ECU 23 is attached to a front face or a rear face of the cell stack 20 in the longitudinal direction of the vehicle 1. As described, the right array of the battery modules 9 and the left array of the battery modules 9 are connected in parallel with each other to achieve a required capacity of the battery pack 7 to operate the motor 4.

The first end plate 16 and the second end plate 17 are made of solid material, and situated on transverse sides of the cell stack 20. The first tension plate 18 is attached to the first end plate 16 and the second end plate 17 above the cell stack 20 by screwing bolts 24 into bores 25 of the first end plate 16 and bores 26 of the second end plate 17. Likewise, the second tension plate 19 is attached to the first end plate 16 and the second end plate 17 below the cell stack 20 by screwing bolts 24 into bores 25 of the first end plate 16 and bores 26 of the second end plate 17. A counterbore is formed on each of the bores 25 and 26 so that a head of each of the bolt 24 is individually held in the counterbore to flatten an outer face 27 of the first end plate 16 and an outer face 28 of the second end plate 17.

In order to adjust a clamping force for bundling the cell stack 20 by the first end plate 16 and the second end plate 17, a shim 29 is individually interposed between the second end plate 17 and the first tension plate 18, and between the second end plate 17 and the second tension plate 19. To this end, a thickness of the shim 29 may be adjusted in such a manner as to achieve a desired clamping force. Here, the shims 29 may be omitted if it is not necessary.

Since the solid electrolyte is employed in the battery module 9, liquid spill will not occur in the battery module 9. In addition, since most of the components of the battery module 9 are made of solid material, a shock resistance of the battery module 9 is enhanced. The first end plate 16 is provided with a pair of fixing plates 30 at both ends and the second end plate 17 is provided with a pair of fixing plates 31 at both ends so that the battery module 9 is fixed to the casing 8 made of insulation material through the fixing plates 30 and 31. Thus, in the battery module 9, the first tension plate 18, the second tension plate 19, and the bolts 24 serve as a bundling member.

Figure 4:
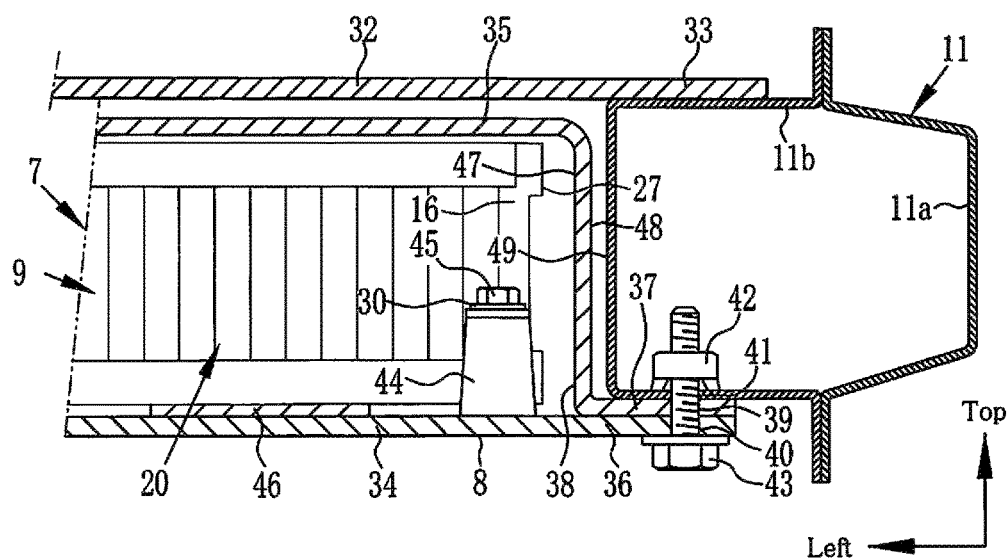
FIG. 4 is a cross-sectional view showing cross-sections of the battery pack and the side sill.

Turning to FIG. 4, there is shown cross-sections of the right array of the battery modules 9 and the right side sill 11. As illustrated in FIG. 4, an outer side sill 11a and an inner side sill 11b are coupled to form the right side sill 11 in such a manner as to create a hollow internal space in the right side sill 11. A floor panel 32 is laid on the battery pack 7, and a right end 33 of the floor panel 32 is attached to the right side sill 11 by welding or the like.

The casing 8 comprises a bottom 34 on which the battery modules 9 are disposed, and a lid 35 covering the transverse sides and the top faces of the battery modules 9. An installation portion 36 is formed on the right end of the bottom 34, and a flange 37 protrudes from an opening end 38 of the lid 35 toward the right side sill 11 to be overlapped on the installation portion 36. An installation hole 39 is formed on the flange 37 of the lid 35, and an installation hole 40 is formed on the installation portion 36. In addition, an installation hole 41 is formed on a bottom of the inner side sill 11b of the right side sill 11, and a weld nut 42 is welded on the inner surface of the inner side sill 11b around the installation hole 41. A bolt 43 is screwed into the weld nut 42 through the installation holes 39, 40, and 41 to fix the battery pack 7 to the right side sill 11.

Installation members 44 are disposed on the bottom 34, and the fixing plates 30 of the first end plate 16 and the fixing plates 31 of the second end plate 17 of the battery module 9 are fixed to the installation members 44 by bolts 45. In addition, a plate-like spacer 46 made of flexible material is interposed between the battery module 9 and the bottom 34. The left array of the battery modules 9 is also attached to the left side sill 12 in a similar manner. Here, the structure of the casing 8 may be modified arbitrarily according to need.

In the casing 8 in which the battery module 9 is thus fixed to the bottom 34, an inner face 47 of the lid 35 and the outer face 27 of the first end plate 16 extend in the vertical direction substantially parallel to each other, and an outer face 48 of the lid 35 and an outer face 49 of the inner side sill 11b extend in the vertical direction substantially parallel to each other. Alternatively, in order to lighten the vehicle weight while ensuring a sufficient rigidity, each of the right side sill 11 and the left side sill 12 may be formed integrally using light aluminum alloy by an extrusion method in such a manner as to maintain a hollow space therein.

Figure 5:
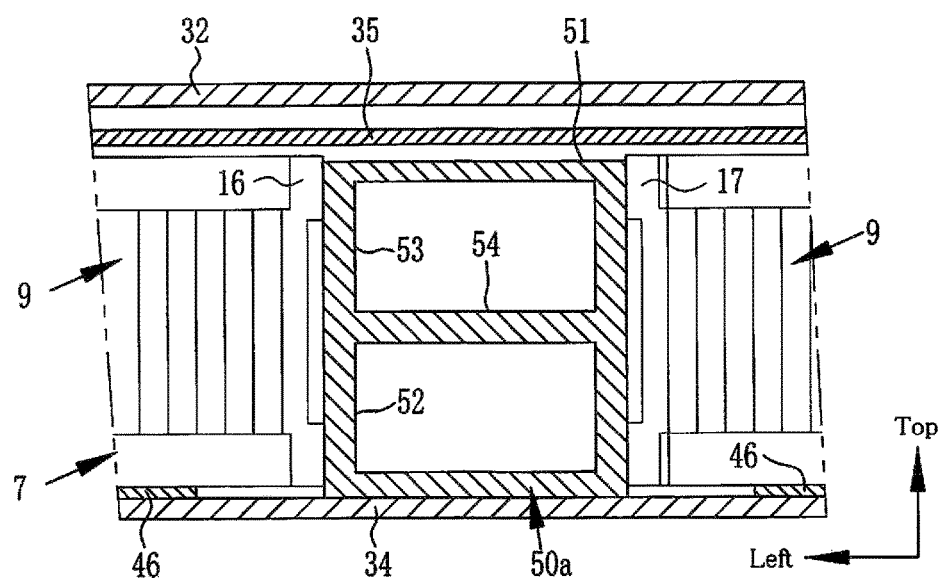
FIG. 5 is a cross-sectional view showing a first example of the load transmission member.

Turning to FIG. 5, there is shown the first example of a load transmission member 50a. As shown in FIG. 5, the battery pack 7 is provided with the load transmission member 50a that transmits an impact load applied to the side of the vehicle 1 in the width direction. To this end, the load transmission member 50a is disposed in a clearance 51 between the battery modules 9, and the load transmission member 50a is adapted to be crushed by the impact load greater than a predetermined magnitude to absorb collision energy. For example, the load transmission member 50a may be made of aluminum or resin material, and an internal space of the load transmission member 50a is divided into a lower hollow space 52 and an upper hollow space 53 by a horizontal partition 54. Optionally, a predetermined clearance may be maintained between each of the battery modules 9 and the load transmission member 50a according to need.

Figure 6:
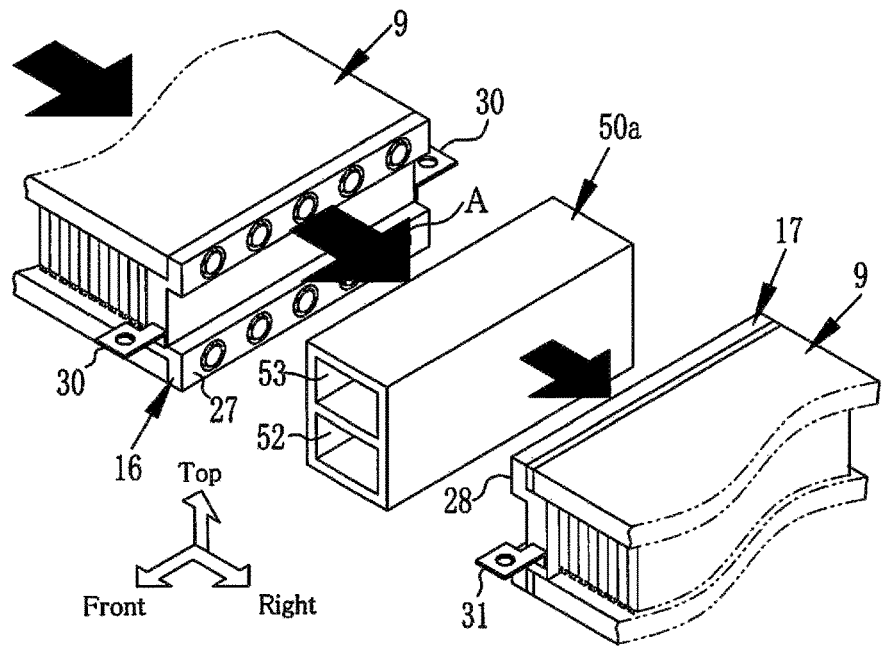
FIG. 6 is a perspective view showing the first example of the load transmission member.

A perspective view of the load transmission member 50a is shown in FIG. 6. As shown in FIG. 6, the load transmission member 50a is a cuboid member having a length substantially identical to side lengths (in the longitudinal direction) of the first end plate 16 and the second end plate 17. As described, when the impact load A that is greater than a predetermined magnitude is applied to the left side of the vehicle 1, the load transmission member 50a is crushed in the width direction of the vehicle 1 by the battery module 9 of the left array to absorb the collision energy. Consequently, the load applied to the battery module 9 of the right array is lightened. In the battery pack 7, the load transmission member 50a is disposed in each clearance between the battery modules 9 of the right array and the left array.

Figure 7:
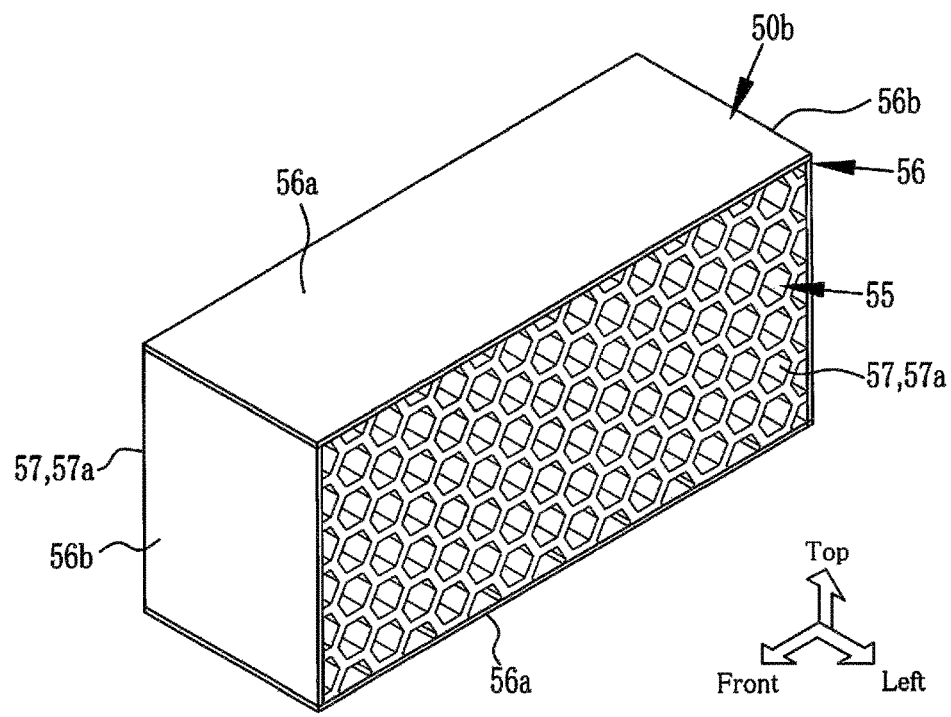
FIG. 7 is a perspective view showing a second example of the load transmission member.

The second example of the load transmission member 50 is shown in FIG. 7. As illustrate in FIG. 7, the load transmission member 50b comprises a honeycomb core 55 and a frame 56 enclosing the honeycomb core 55. The honeycomb core 55 comprises a plurality of hollow hexagonal cells 57 extending in the width direction. The frame 56 is a cuboid member comprising a pair of long plates 56a covering the top and the bottom of the honeycomb core 55, and a pair of short plates 56b covering a front end and a rear end of the honeycomb core 55. That is, both openings 57a of each of the cell 57 are opened. For example, the honeycomb core 55 may be made of aluminum or carbon fiber reinforced plastic material. On the other hand, the frame 56 may be made of aluminum or other metal material. A length of the load transmission member 50b is also substantially identical to side lengths of the first end plate 16 and the second end plate 17 of the battery module 9, and the load transmission member 50b is also disposed lengthwise in each clearance between the battery modules 9 of the right array and the left array. The load transmission member 50*b* is also crushed in the width direction by the impact load applied from the side of the vehicle 1 to absorb collision energy, if the impact load is greater than the predetermined magnitude.

Figure 8:
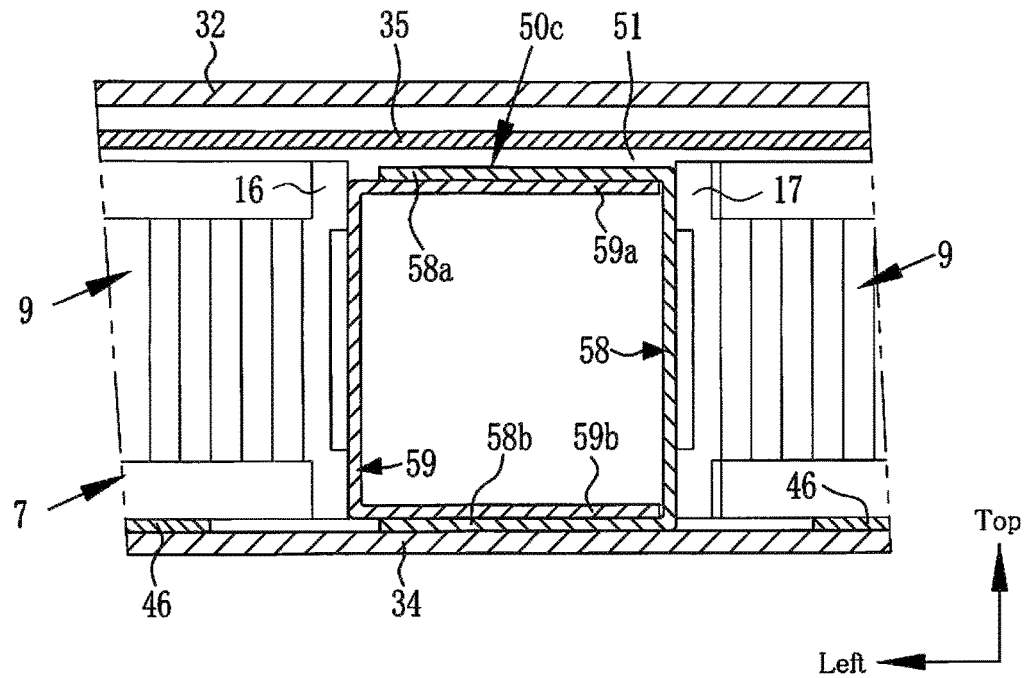
FIG. 8 is a cross-sectional view showing a third example of the load transmission member.

The third example of the load transmission member 50 is shown in FIG. 8. As illustrated in FIG. 8, the load transmission member 50*c* is formed by combining a first U-shaped frame 58 and a second U-shaped frame 59 in such a manner as to create a hollow space therein. Specifically, lengths of the first U-shaped frame 58 and the second U-shaped frame 59 are substantially identical to those of the first end plate 16 and the second end plate 17. The first U-shaped frame 58 and the second U-shaped frame 59 are combined in such a manner that an opening of the first U-shaped frame 58 is oriented to the battery module 9 of the left array, and that an opening of the second U-shaped frame 59 is oriented to the battery module 9 of the right array. Consequently, an upper bent portion 58*a* of the first U-shaped frame 58 is overlapped on an upper bent portion 59*a* of the second U-shaped frame 59, and a lower bent portion 59*b* of the second U-shaped frame 59 is overlapped on a lower bent portion 58*b* of the first U-shaped frame 58. That is, an impact transmitting channel to transmit the impact load in the width direction of the vehicle 1 is formed by combining the first U-shaped frame 58 and the second U-shaped frame 59. The load transmission member 50*c* is also crushed in the width direction by the impact load applied from the side of the vehicle 1 to absorb collision energy, if the impact load is greater than the predetermined magnitude.

Figure 9:
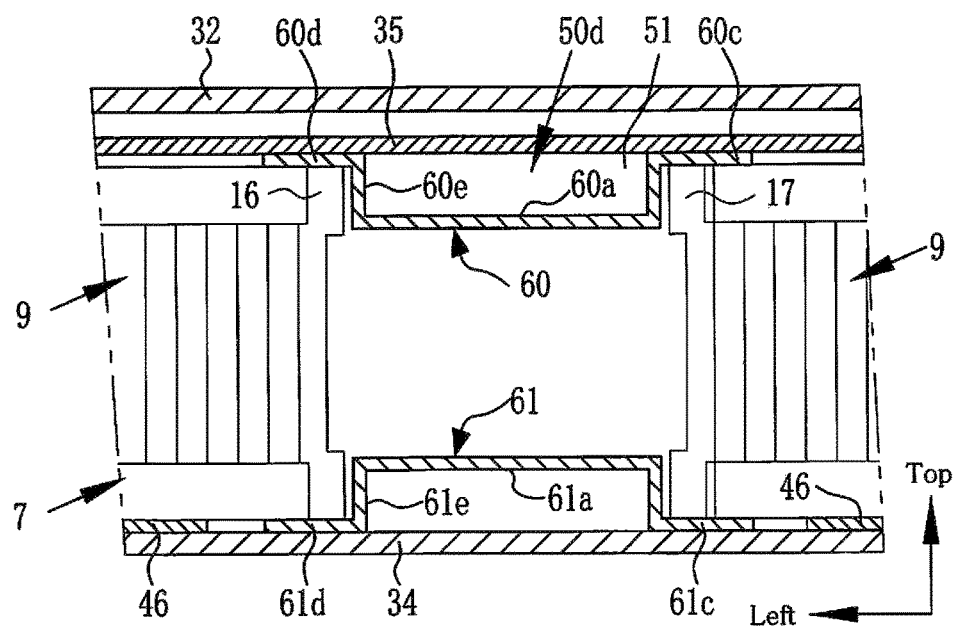
FIG. 9 is a cross-sectional view showing a fourth example of the load transmission member.
Figure 10:
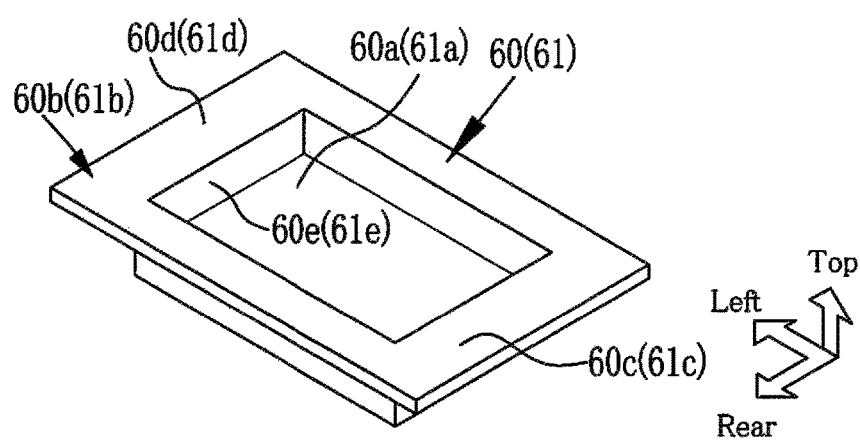
FIG. 10 is a perspective view showing a reinforcement plate of the example shown in FIG. 9.

The fourth example of the load transmission member 50 is shown in FIGS. 9 and 10. In the fourth example, the load transmission member 50*d* includes an upper reinforcement plate 60 and a lower reinforcement plate 61. Dimensions of the upper reinforcement plate 60 and the lower reinforcement plate 61 are substantially identical to each other, and lengths of the upper reinforcement plate 60 and the lower reinforcement plate 61 are also substantially identical to those of the first end plate 16 and the second end plate 17. FIG. 10 shows a structure of the upper reinforcement plate 60 in more detail. As illustrated in FIG. 10, a rectangular depression 60*a* is formed on a central region of the upper reinforcement plate 60, and a flange 60*b* is formed around the depression 60*a*. A structure of the lower reinforcement plate 61 is substantially identical to that of the upper reinforcement plate 60 shown in FIG. 10. A right flange 60*c* and a left flange 60*d* of the upper reinforcement plate 60 are individually inserted between the battery module 9 and the lid 35 in such a manner that the depression 60*a* is depressed downwardly.

Likewise, the right flange 61*c* and the left flange 61*d* of the lower reinforcement plate 61 are individually inserted between the battery module 9 and the bottom 34 in such a manner that the depression 61*a* is depressed upwardly. In the upper reinforcement plate 60, each side wall 60*e* of the depression 60*a* serves as a load receiving face. Likewise, in the lower reinforcement plate 61, each side face 61*e* of the depression 61*a* serves as a load receiving face. Thus, in the load transmission member 50*d*, the upper reinforcement plate 60 and the lower reinforcement plate 61 serve as the impact transmitting channels for transmitting the impact load between the battery modules 9 of the right array and the left array. The upper reinforcement plate 60 and the lower reinforcement plate 61 are also crushed in the width direction by the impact load applied from the side of the vehicle 1 to absorb collision energy, if the impact load is greater than the predetermined magnitude.

Figure 11:
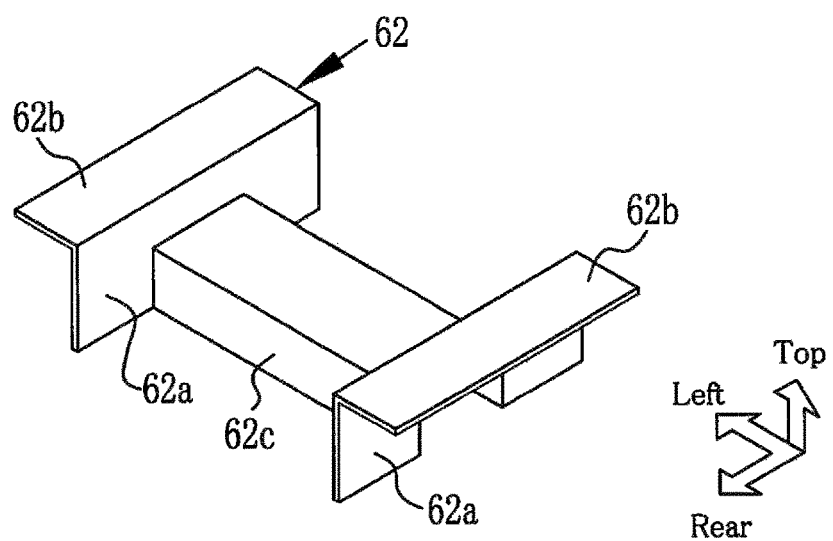
FIG. 11 is a perspective view showing a modification example of the reinforcement plate.

FIG. 11 shows a modification example of the reinforcement plates 60 and 61. A reinforcement plate 62 shown in FIG. 11 comprises a pair of side plates 62*a*, flanges 62*b* individually extending from upper edges of the side plates 62*a* away from each other in the width direction, and a connection member 62*c* whose cross-section is U-shape connecting the side plates 62*a*. The flanges 62*b* of the upper reinforcement plate 62 are individually inserted between the battery module 9 and the lid 35 in such a manner that an opening of the connection member 62*c* opens downwardly, and the flanges 62*b* of the lower reinforcement plate 62 are individually inserted between the battery module 9 and the bottom 34 in such a manner that the opening of the connection member 62*c* opens upwardly. In this case, the upper reinforcement plate 62 and the lower reinforcement plate 62 serve as the impact transmitting channels for transmitting the impact load between the battery modules 9 of the right array and the left array. The upper reinforcement plate 62 and the lower reinforcement plate 62 are also crushed in the width direction by the impact load applied from the side of the vehicle 1 to absorb collision energy, if the impact load is greater than the predetermined magnitude.

Figure 12:
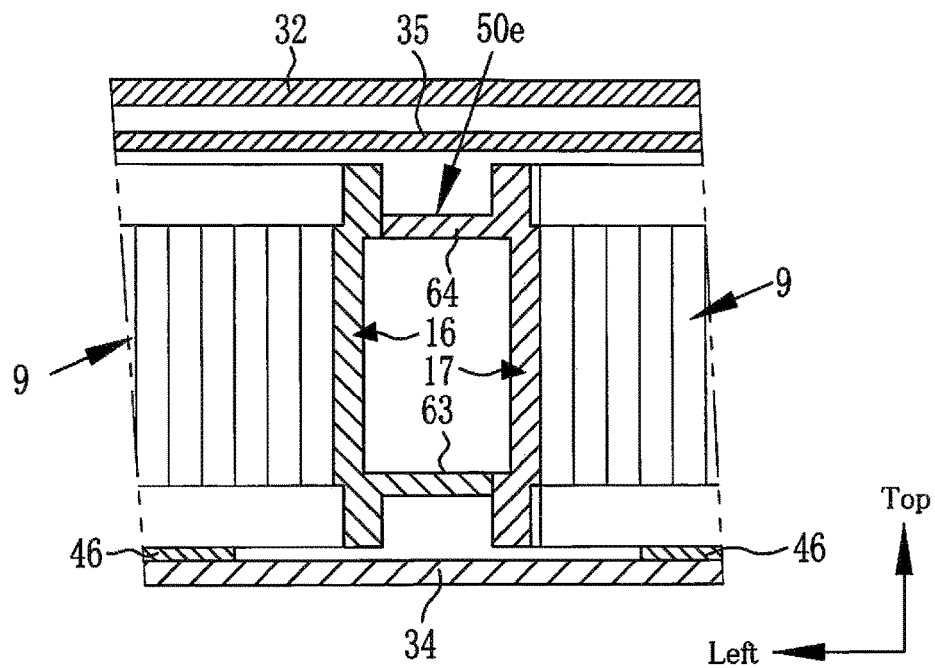
FIG. 12 is a cross-sectional view showing a fifth example of the load transmission member.

The fifth example of the load transmission member 50 is shown in FIG. 12. In the load transmission member 50*e* shown in FIG. 12, a first protrusion 63 is formed integrally with the first end plate 16 in such a manner as to protrude from a lower end of the first end plate 16 toward the second end plate 17, and a leading end of the first protrusion 63 is contacted to the second end plate 17. Likewise, a second protrusion 64 is formed integrally with the second end plate 17 in such a manner as to protrude from an upper end of the second end plate 17 toward the first end plate 16, and a leading end of the second protrusion 64 is contacted to the first end plate 16. Thus, in the load transmission member 50*e*, the first protrusion 63 and the second protrusion 64 serve as the impact transmitting channels for transmitting the impact load between the battery modules 9 of the right array and the left array. The first protrusion 63 and the second protrusion 64 are also crushed in the width direction by the impact load applied from the side of the vehicle 1 to absorb collision energy, if the impact load is greater than the predetermined magnitude.

Figure 13:
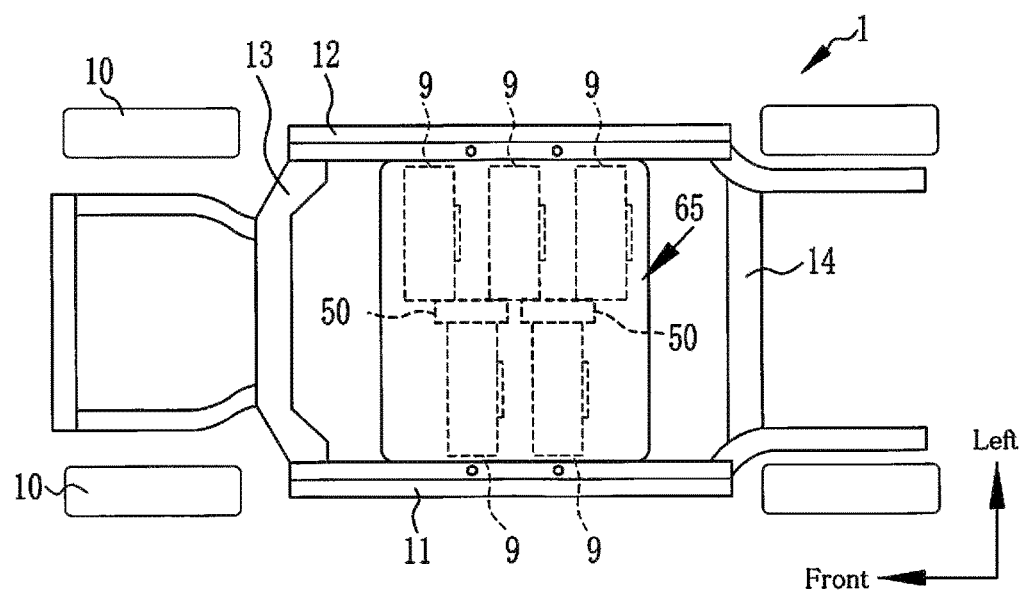
FIG. 13 is a schematic illustration showing another example of the battery pack.

Turning to FIG. 13, there is shown another example of the battery pack. In the vehicle 1 shown in FIG. 13, five of the battery modules 9 are arranged in a battery pack 65. Specifically, two of the battery modules 9 are juxtaposed to form the right array, and three of the battery modules 9 are juxtaposed to form the left array. As illustrated in FIG. 13, the battery modules 9 of the right array and the battery modules 9 of the left array are juxtaposed alternately so that a rear half of the first end plate 16 of the battery module 9 in the left array is individually overlapped with a front half of the second end plate 17 of the battery module 9 in the right array. In this case, one of load transmission members 50 according to the foregoing examples is interposed between the front battery module 9 in the right array and the front and middle battery modules 9 in the left array, and the load transmission member 50 is also interposed between the rear battery module 9 in the right array and the middle and rear battery modules 9 in the left array.

For example, when an impact load is applied from the right side of the vehicle 1, the impact load applied to one of the battery modules 9 in the right array is distributed to two of the battery modules 9 through one of the load transmission members 50. In the vehicle 1, therefore, the impact load applied from the side of the vehicle 1 will not be applied to only one of the battery modules 9 through the load transmission member 50. Alternatively, the load transmission members 50 may also be formed integrally to extend in the longitudinal direction between the right and the left arrays of the battery modules 9. Thus, in the vehicle 1, the battery modules 9 of the right array and the battery modules 9 of the left array may be arranged in an asymmetrical manner.

Figure 14:
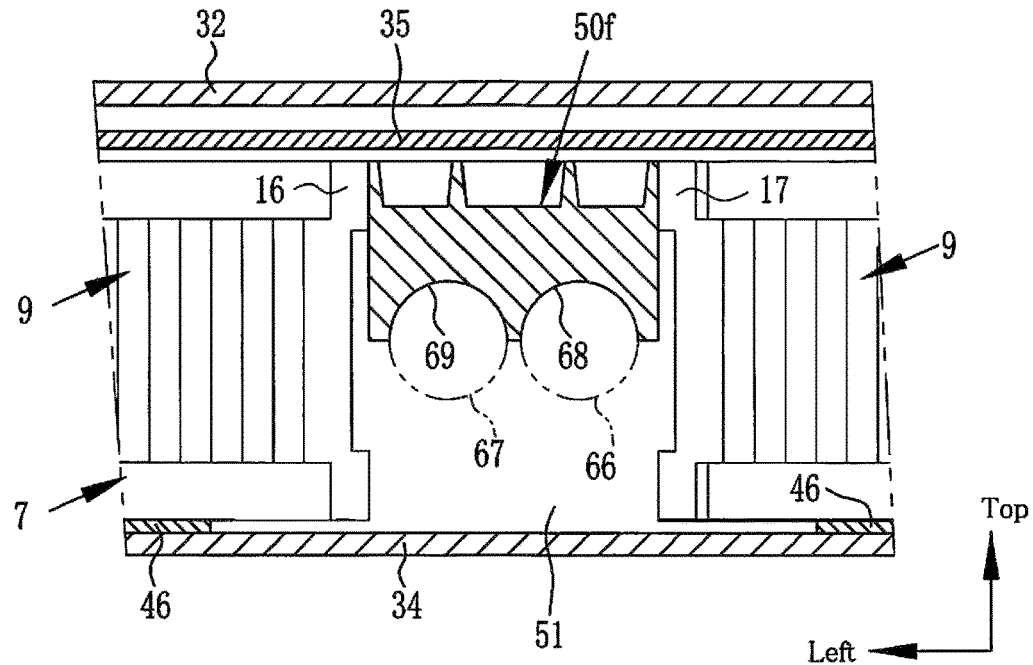
FIG. 14 is a cross-sectional view showing a sixth example of the load transmission member.

The sixth example of the load transmission member 50 is shown in FIG. 14. As illustrated in FIG. 14, a first cable 66 extends longitudinally between the battery modules 9 of the right array and the left array while connecting one of the electrodes of the battery modules 9 to the converter 2, and a second cable 67 extends longitudinally between the battery modules 9 of the right array and the left array while connecting the other one of the electrodes of the battery modules 9 to the converter 2. For example, a cable comprising a bundle of copper wires and a wire insulation made of thermally and frictionally resistant resin covering the bundle of wires may be used as the first cable 66 and the second cable 67.

As illustrated in FIG. 14, the load transmission member 50f is also interposed between the battery modules 9 of the right array and the left array, and the load transmission member 50f comprises a first protector portion 68 and a second protector portion 69 as arcuate depressions extending parallel to each other in the longitudinal direction. Specifically, an upper portion of the first cable 66 is held in the first protector portion 68, and an upper portion of the second cable 67 is held in the second protector portion 69. As depicted in FIG. 14, a width of the load transmission member 50f is wider than a total diameter of the first cable 66 and the second cable 67. Optionally, an inner surface of each of the first protector portion 68 and the second protector portion 69 may be covered with protective coating or the like.

Figure 15:
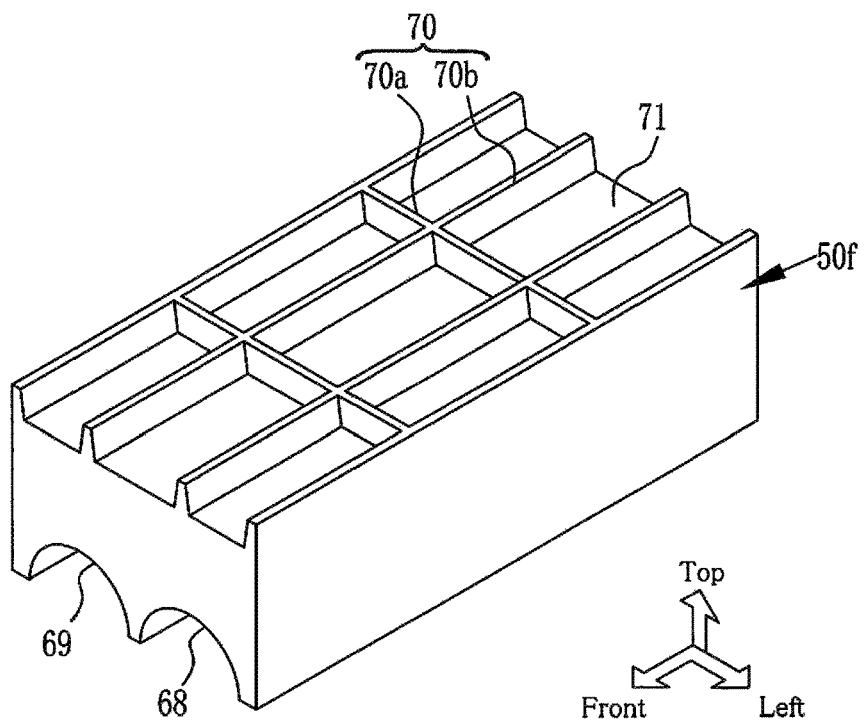
FIG. 15 is a perspective view showing the sixth example of the load transmission member.

A perspective view of the load transmission member 50f is shown in FIG. 15. For example, the load transmission member 50f is formed by a molding method using resin material. In order to prevent formation of sinks resulting from shrinkage of the material, a reinforcement rib 70 is formed on a top surface 71 of the load transmission member 50f in a reticular pattern. Specifically, the rib 70 includes a plurality of lateral ribs 70a and a plurality of longitudinal ribs 70b. The above-explained first protector portion 68 and second protector portion 69 are formed on the bottom side of the load transmission member 50f. The first cable 66 held in the first protector portion 68 and the second cable 67 held in the second protector portion 69 are situated outside of the impact transmitting channel. In other words, the impact load applied from one side of the vehicle 1 is transmitted between the adjoining battery modules 9 through the load transmission member 50f while detouring around the first cable 66 and the second cable 67. For this reason, the impact load applied to the first cable 66 and the second cable 67 may be lightened. As the foregoing examples, the load transmission member 50f is also crushed in the width direction by the impact load applied from the side of the vehicle 1 to absorb collision energy, if the impact load is greater than the predetermined magnitude.

Figure 16:
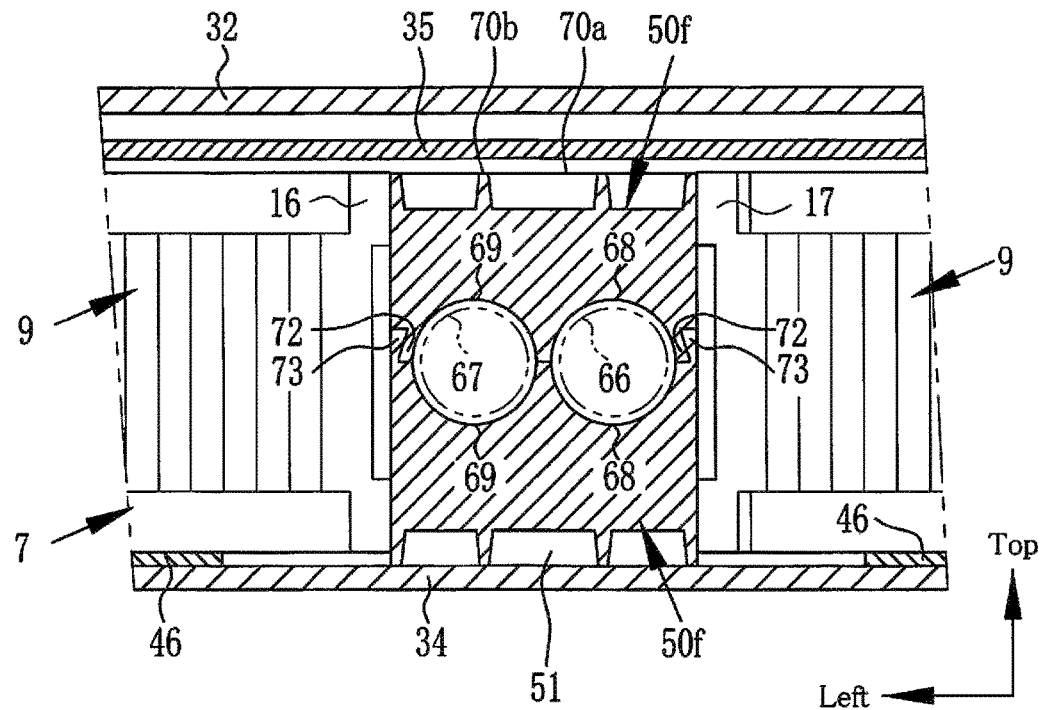
FIG. 16 is a cross-sectional view showing an example of using a pair of the load transmission members shown in FIG. 15.

FIG. 16 shows an example of using a pair of load transmission members 50f. In the example shown in FIG. 16, the upper load transmission member 50f is provided with inner hooks 72 on leading ends of sidewalls, and the lower load transmission member 50f is provided with outer hooks 73 on leading ends of sidewalls. The upper load transmission member 50f and the lower load transmission member 50f are combined with each other by engaging the inner hooks 72 with the outer hooks 73 in such a manner as to form cable holders therebetween. The first cable 66 is held in one of the cable holders thus formed by combining the first protector portions 68 of the upper and the lower load transmission members 50f, and the second cable 67 is held in the other cable holder thus formed by combining the second protector portions 69 of the upper and the lower load transmission members 50f. Alternatively, the upper load transmission member 50f and the lower load transmission member 50f may also be formed integrally.

Figure 17:
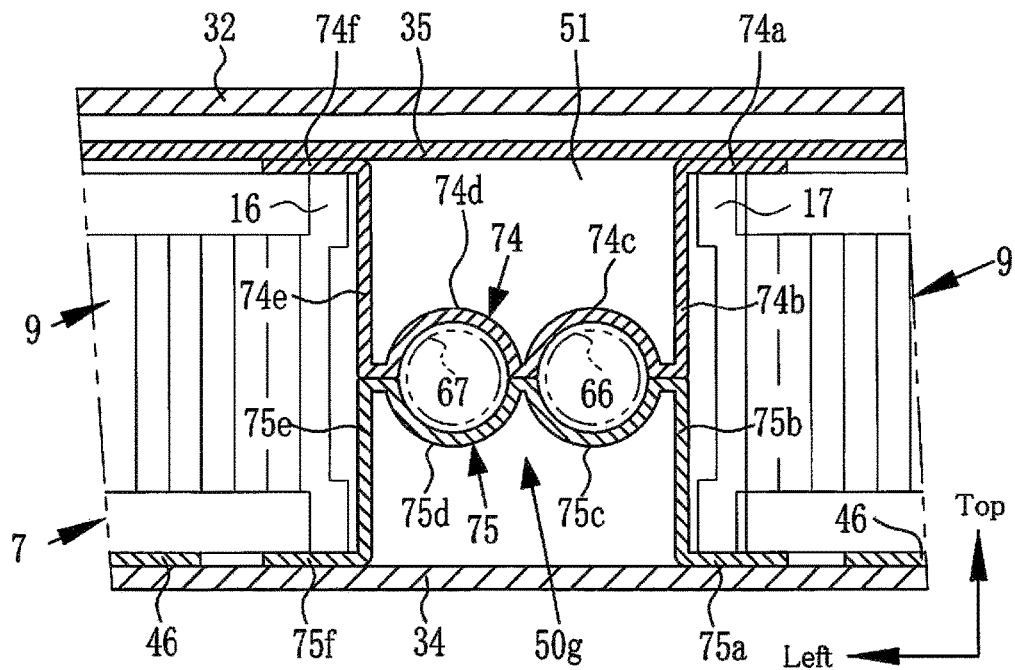
FIG. 17 is a cross-sectional view showing a seventh example of the load transmission member.

The seventh example of the load transmission member 50 is shown in FIG. 17. As illustrated in FIG. 17, the load transmission member 50g includes an upper reinforcement plate 74 and a lower reinforcement plate 75. Each of the upper reinforcement plate 74 and the lower reinforcement plate 75 serves not only as the impact transmitting channel but also as a protector of the cables. Specifically, the upper reinforcement plate 74 includes a right flange 74a formed on the right end of the upper reinforcement plate 74, a right sidewall 74b extending vertically, an arcuate first protector portion 74c, an arcuate second protector portion 74d, a left sidewall 74e extending vertically, and a left flange 74f formed on the left end of the upper reinforcement plate 74. The right flange 74a and the left flange 74f of the upper reinforcement plate 74 are individually inserted between the battery module 9 and the lid 35 in such a manner that the first protector portion 74c and the second protector portion 74d are opened downwardly.

The lower reinforcement plate 75 also includes the right flange 75a formed on the right end of the lower reinforcement plate 75, the right sidewall 75b extending vertically, the arcuate first protector portion 75c, the arcuate second protector portion 75d, the left sidewall 75e extending vertically, and the left flange 75f formed on the left end of the lower reinforcement plate 75. The right flange 75a and the left flange 75f of the lower reinforcement plate 75 are individually inserted between the battery module 9 and the bottom 34 in such a manner that the first protector portion 75c and the second protector portion 75d are opened upwardly. The first cable 66 is held in one of the cable holders formed by combining the first protector portions 74c and 75c of the upper and the lower reinforcement plates 74 and 75, and the second cable 67 is held in the other cable holder thus formed by combining the second protector portions 74d and 75d of the upper and the lower reinforcement plates 74 and 75. For example, when the impact load is applied from the right side of the vehicle 1, the impact load is transmitted from the battery module 9 in the right array to the battery modules 9 in the left array though the upper reinforcement plate 74 and the lower reinforcement plate 75 serving as the impact transmitting channels while detouring the first cable 66 and the second cable 67. For this reason, the impact load applied to the first cable 66 and the second cable 67 may be lightened. As the foregoing examples, the load transmission member 50g is also crushed in the width direction by the impact load applied from the side of the vehicle 1 to absorb collision energy, if the impact load is greater than the predetermined magnitude.

Figure 18:
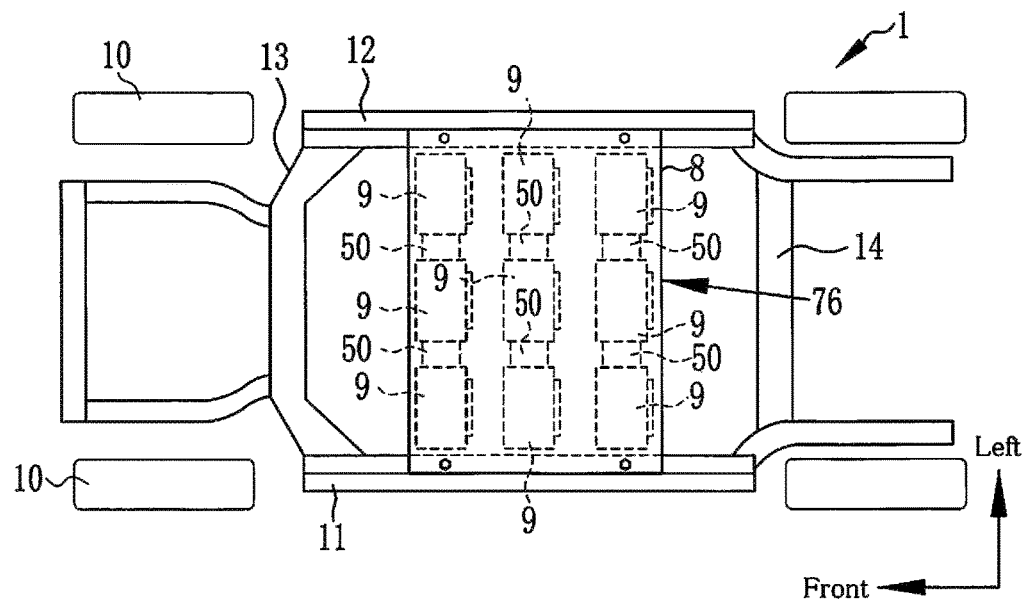
FIG. 18 is a schematic illustration showing still another example of the battery pack.

FIG. 18 shows still another example of the battery pack. In the example shown in FIG. 18, three arrays of the battery modules 9 are arranged in the battery pack 76, and three of the battery modules 9 are juxtaposed in each array. In the battery pack 76, any one of the load transmission member 50 according to the foregoing examples is disposed in each clearance between the battery modules 9 in the left array and the battery modules 9 in the middle array, and in each clearance between the battery modules 9 in the middle array and the battery modules 9 in the right array. In this example, the number of battery modules 9 in each array may be altered arbitrarily according to need.

Figure 19:
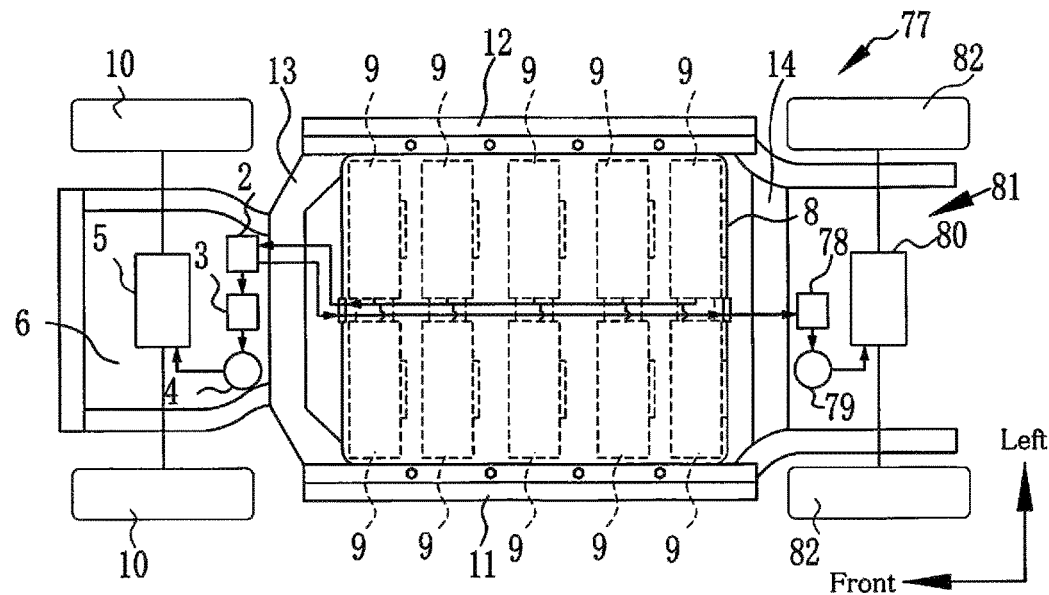
FIG. 19 is a schematic illustration showing an example of a structure of a four-wheel drive electric vehicle.

FIG. 19 shows one example of a four-wheel drive electric vehicle. In the vehicle 77 shown in FIG. 19, the first converter 2, the first inverter 3, the first motor 4, and the first power transmission unit 5 are also arranged in the front compartment 6. In addition, a second inverter 78, a second motor 79, and a second power transmission unit 80 are arranged in a rear compartment 81. The first power transmission unit 5 transmits torque of the first motor 4 to the front wheels 10 while increasing or decreasing, and the second power transmission unit 80 transmits torque of the second motor 79 to rear wheels 82 while increasing or decreasing.

Figure 20:
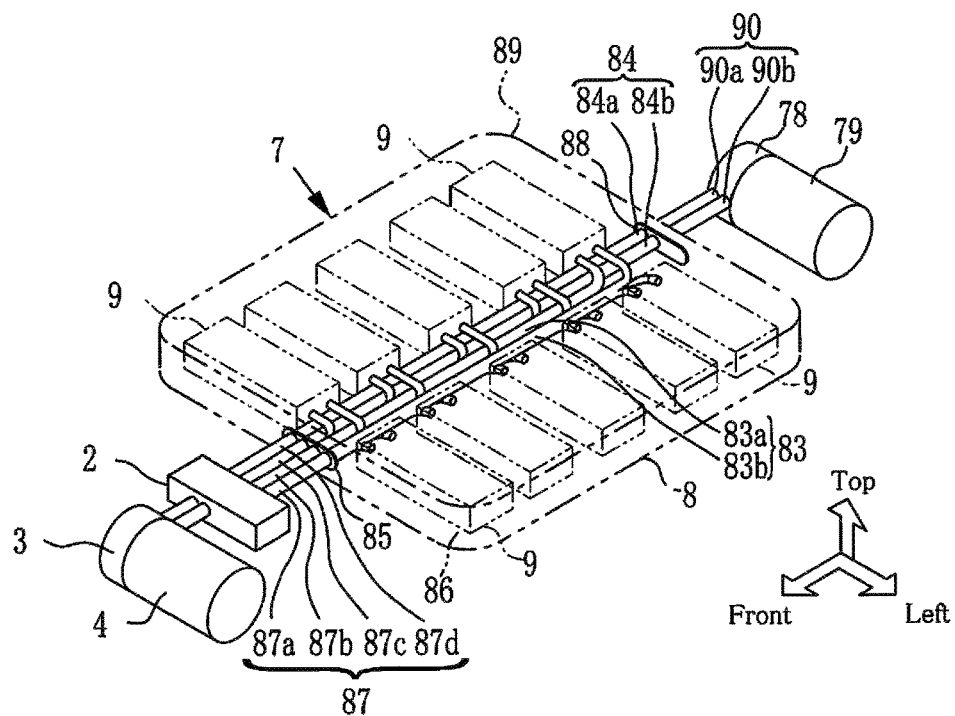
FIG. 20 is a perspective view showing an example of wiring in the battery pack shown in FIG. 19.

FIG. 20 shows one example of wiring in the battery pack 7 shown in FIG. 19. As described, the converter 2 is arranged in the front compartment 6, and the converter 2 is adapted to increase a voltage from the battery modules 9, and to apply the voltage to the first inverter 3 and the second inverter 78. A first cable harness 83 extends longitudinally between the right array of the battery modules 9 and the left array of the battery modules 9, and the first cable harness 83 includes a first cable 83a connecting one of the electrodes of the battery modules 9 to the converter 2, and a second cable 83b connecting the other electrodes of the battery modules 9 to the converter 2. A second cable harness 84 also extends longitudinally between the right array of the battery modules 9 and the left array of the battery modules 9, and the second cable harness 84 includes a third cable 84a connecting one of the electrodes of the converter 2 to the second inverter 78, and a fourth cable 84b connecting the other electrodes of the converter 2 to the second inverter 78.

In the casing 8, a first hub 85 is arranged in a front face 86, and front ends of the first cable 83a and the second cable 83b of the first cable harness 83, and the third cable 84a and the fourth cable 84b of the second cable harness 84 are plugged into the first hub 85 from an inner side of the casing 8. A third cable harness 87 connects the first cable harness 83 and the second cable harness 84 to the converter 2 through the first hub 85. Specifically, the third cable harness 87 includes: a fifth cable 87a connecting the first cable 83a of the first cable harness 83 to the converter 2; a sixth cable 87b connecting the second cable 83b of the first cable harness 83 to the converter 2; a seventh cable 87c connecting the third cable 84a of the second cable harness 84 to the converter 2; and an eighth cable 87d connecting the fourth cable 84b of the second cable harness 84 to the converter 2. A second hub 88 is arranged in a rear face 89 of the casing 8, and rear ends of the third cable 84a and the fourth cable 84b of the second cable harness 84 are plugged into the second hub 88 from an inner side of the casing 8. The second hub 88 is connected to the second inverter 78 through a fourth cable harness 90. Specifically, the fourth cable harness 90 includes a ninth cable 90a connecting the third cable 84a of the second cable harness 84 to the second inverter 78, and a tenth cable 90b connecting the fourth cable 84b of the second cable harness 84 to the second inverter 78.

Figure 21:
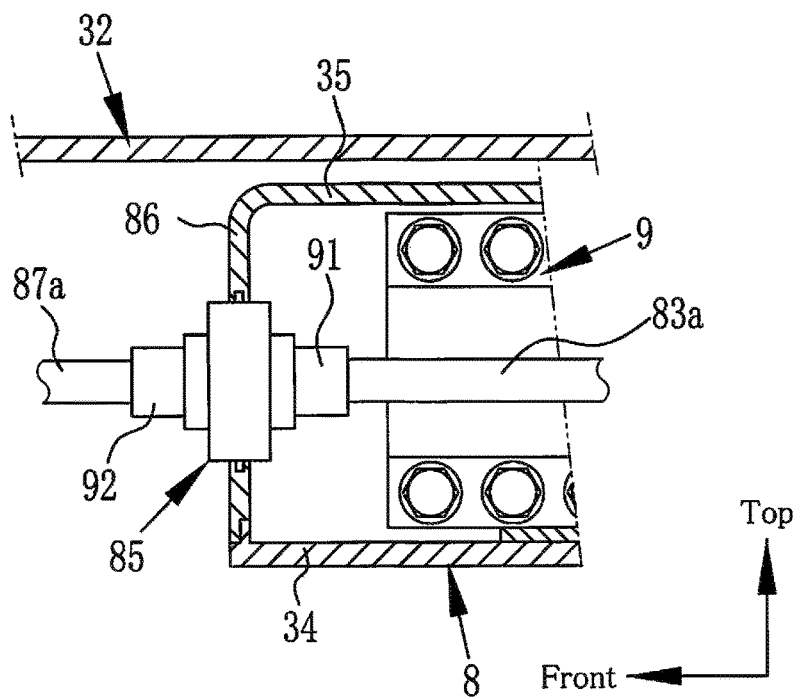
FIG. 21 is a cross-sectional view showing a first hub shown in FIG. 20.

A cross-section of the first hub 85 is shown in FIG. 21. As shown in FIG. 21, for example, a waterproof and dustproof connector 91 attached to a front end of the first cable 83a of the first cable harness 83 is inserted into one of sockets of the first hub 85 from the inner side of the casing 8, and a waterproof and dustproof connector 92 attached to a rear end of the fifth cable 87a of the third cable harness 87 is inserted into said one of the sockets of the first hub 85 from the outer side of the casing 8. The remaining cables of the harnesses are inserted into the remaining sockets of the first hub 85 and the second hub 88 in similar fashion, and detailed explanations therefor will be omitted.

Figure 22:
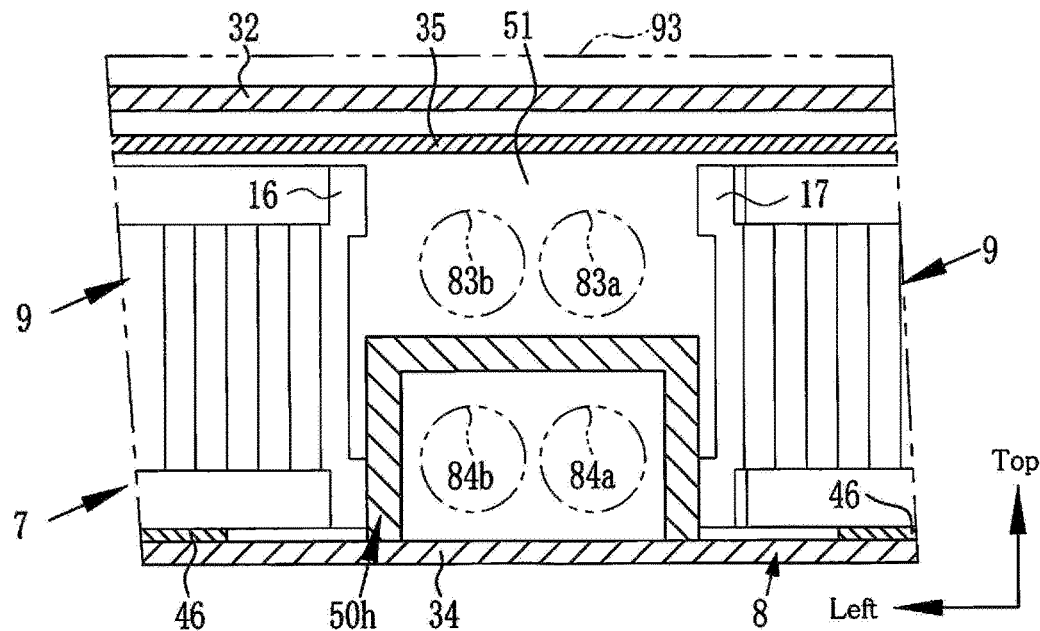
FIG. 22 is a cross-sectional view showing an eighth example of the load transmission member.

FIG. 22 shows the eighth example of the load transmission member 50 to be used to protect the battery pack 7 shown in FIG. 20. The load transmission member 50h is a U-shaped bar member extending in the longitudinal direction of the vehicle 77, and each end face of the vertical plates are attached to the bottom 34 between the battery modules 9 in the right array and the left array. As illustrated in FIG. 22, the first cable 83a and the second cable 83b of the first cable harness 83 extend in an upper space of the load transmission member 50h, and the third cable 84a and the fourth cable 84b of the second cable harness 84 extend in a lower space of the load transmission member 50h.

The lid 35 may be made of electromagnetic protective metallic material to protect a vehicle compartment 93 from electromagnetic wave radiated from the first cable harness 83 and the second cable harness 84. In addition, the load transmission member 50h and the casing 8 may also be made of the electromagnetic protective metallic material at least partially. Alternatively, an electromagnetic shield layer or an electromagnetic absorber member may also be attached to the lid 35 or the load transmission member 50h.

Since the second cable harness 84 connects the converter 2 with the second inverter 78, voltage supplied through the second cable harness 84 is higher than that supplied through the first cable harness 83. Therefore, it is preferable to form the load transmission member 50h using the electromagnetic protective metallic material. The load transmission member 50h is also crushed in the width direction by the impact load applied from the side of the vehicle 77 to absorb collision energy, if the impact load is greater than the predetermined magnitude.

Figure 23:
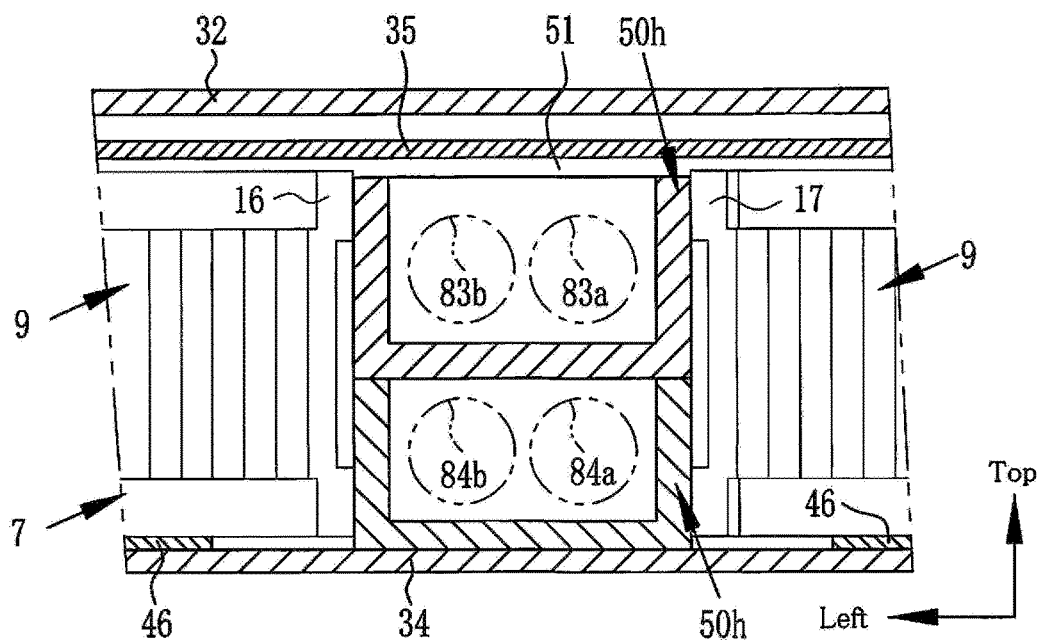
FIG. 23 is a cross-sectional view showing an example of using a pair of load transmission members shown in FIG. 22.

FIG. 23 shows an example of using a pair of load transmission members 50h. In the example shown in FIG. 23, the lower load transmission member 50h is disposed on the bottom 34 in such a manner as to open upwardly, and the upper load transmission member 50h is disposed on the lower load transmission member 50h in such a manner as to open upwardly. In this case, the first cable 83a and the second cable 83b of the first cable harness 83 extend in the internal space of the upper load transmission member 50h, and the third cable 84a and the fourth cable 84b of the second cable harness 84 extend in the internal space of the lower load transmission member 50h. Alternatively, the lower load transmission member 50h may also disposed on the bottom 34 in such a manner as to open downwardly, and the upper load transmission member 50h is disposed on the lower load transmission member 50h in such a manner as to open downwardly.

Figure 24:
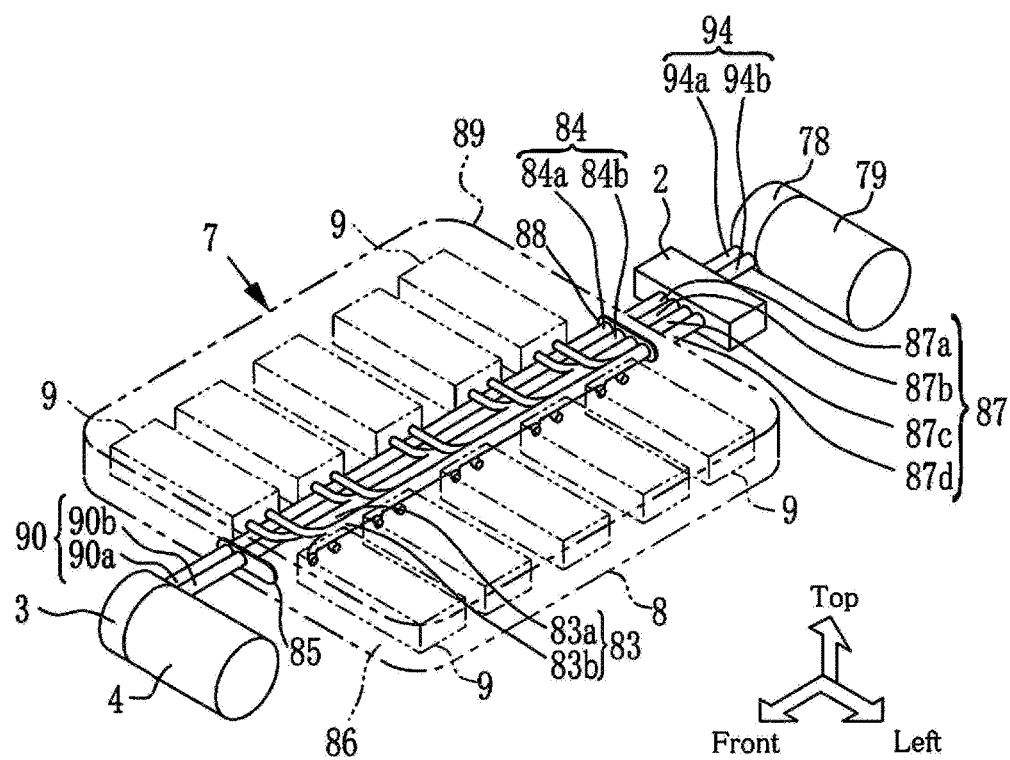
FIG. 24 is a perspective view showing an example of f arranging a converter in the rear side.

FIG. 24 shows an example of arranging the converter 2 in the rear side. In the example shown in FIG. 24, the first hub 85 is arranged in a front face 86 of the casing 8, and the second hub 88 is arranged in the rear face 89 of the casing 8. The first inverter 3 is connected to the first hub 85 through the fourth cable harness 90. The third cable harness 87 connects the first cable harness 83 and the second cable harness 84 to the converter 2 through the second hub 88, and the converter 2 is further connected to the second inverter 78 through a fourth cable harness 94 including an eleventh cable 94a and a twelfth cable 94b. The remaining structures are similar to those of the example shown in FIG. 20.

Although the above exemplary embodiments of the present application have been described, it will be understood by those skilled in the art that the present application should not be limited to the described exemplary embodiments, and various changes and modifications can be made within the spirit and scope of the present disclosure. For example, the load transmission member according to the present disclosure may also be applied to hybrid vehicles and plug-in hybrid vehicles in which a prime mover includes an engine and at least one motor. In addition, the load transmission member according to the present disclosure may also be applied to electric vehicles in which each wheel is individually driven by own motor.

What is claimed is:

1. A battery mounting structure for a vehicle, comprising:
   a pair of frame members extending in a longitudinal direction of the vehicle, the frame members being separated from one another by a first clearance in a width direction of the vehicle;
   a battery pack having a cell stack formed of a plurality of single cells that is disposed between the frame members; and
   a load transmission member that is disposed in a second clearance between arrays of the cell stack to transmit an impact load applied from a side of the vehicle in the width direction of the vehicle, the load transmission member comprising at least one sidewall that
   defines a hollow space within the load transmission member and at least one horizontal partition extending from a first side of the load transmission member to a second side of the load transmission member such that the hollow space is split into a first space and a second space, the at least one horizontal partition being in the second clearance.

2. The battery mounting structure for a vehicle as claimed in claim 1, wherein the load transmission member is substantially cuboid, the horizontal partition extends in the width direction of the vehicle such that the first space is an upper hollow space and the second space is a lower hollow space, and the load transmission member comprises a material such that the load transmission member is crushable in the width direction of the vehicle based on the impact load applied from the side of the vehicle being greater than a predetermined magnitude to absorb collision energy.

3. The battery mounting structure for a vehicle as claimed in claim 1, further comprising:
   a cable member extending longitudinally in the second clearance; and
   wherein the load transmission member is adapted to transmit the impact load while detouring the cable member.

4. The battery mounting structure for a vehicle as claimed in claim 3, wherein the load transmission member includes a protector portion covering the cable member at least partially.

5. The battery mounting structure for a vehicle as claimed in claim 3,
   wherein the battery pack includes a casing in which arrays of the cell stacks are arranged, and
   wherein at least one of the casing or the load transmission member is interposed between the cable member and a vehicle compartment such that the vehicle compartment is protected from electromagnetic waves.

6. The battery mounting structure for a vehicle as claimed in claim 3,
   wherein the cable member includes a first cable member and a second cable member to which a higher voltage is applied, and
   wherein the load transmission member protects a vehicle compartment from electromagnetic waves, and covers the second cable member.

7. The battery mounting structure for a vehicle as claimed in claim 1,
   wherein the single cell includes a solid electrolyte, and
   wherein the battery pack is attached to the frame members in such a manner that the single cells are juxtaposed in the width direction of the vehicle.

8. The battery mounting structure for a vehicle as claimed in claim 1, wherein the battery pack includes a casing in which arrays of the cell stacks are arranged, and the battery pack is disposed between the frame members in such a manner that side faces of the casing extend parallel to inner faces of the frame members.

9. The battery mounting structure for a vehicle as claimed in claim 7, wherein the battery pack includes a battery module, comprising:
   a pair of end plates holding the cell stack from both ends; and
   a bundling member connecting the end plates to bundle the cell stack between the end plates.

10. The battery mounting structure for a vehicle as claimed in claim 9, wherein the battery pack includes a casing in which arrays of the cell stacks are arranged, and the battery module is arranged in such a manner that an outer face of one of the end plates extends parallel to an inner face of the casing.

* * * * *